United States Patent
Swatsky et al.

(10) Patent No.: US 10,849,206 B2
(45) Date of Patent: *Nov. 24, 2020

(54) BATTERY-POWERED RETROFIT REMOTE CONTROL DEVICE

(71) Applicant: Lutron Technology Company LLC, Coopersburg, PA (US)

(72) Inventors: Matthew J. Swatsky, Allentown, PA (US); Chris Dimberg, Easton, PA (US); Timothy S. Majewski, New Tripoli, PA (US); Robert C. Newman, Jr., Emmaus, PA (US); Daniel Curtis Raneri, Orefield, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/152,398

(22) Filed: Oct. 4, 2018

(65) Prior Publication Data

US 2019/0037674 A1 Jan. 31, 2019

Related U.S. Application Data

(63) Continuation of application No. 15/386,869, filed on Dec. 21, 2016, now Pat. No. 10,147,560, which is a
(Continued)

(51) Int. Cl.
*H05B 47/19* (2020.01)
*H05B 47/10* (2020.01)
(Continued)

(52) U.S. Cl.
CPC ............... *H05B 47/19* (2020.01); *H01H 3/02* (2013.01); *H05B 47/10* (2020.01); *H05B 47/11* (2020.01);
(Continued)

(58) Field of Classification Search
CPC ........ H05B 47/19; H05B 47/10; H05B 47/11; H01H 3/02
See application file for complete search history.

(56) References Cited

U.S. PATENT DOCUMENTS

| 3,032,688 A | 5/1962 | Spira |
| 5,099,193 A | 3/1992 | Moseley et al. |

(Continued)

FOREIGN PATENT DOCUMENTS

| CN | 2596671 Y | 12/2003 |
| GB | 2485805 A | 5/2012 |

(Continued)

*Primary Examiner* — Borna Alaeddini
(74) *Attorney, Agent, or Firm* — Flaster Greenberg, P.C.

(57) ABSTRACT

A remote control device may be configured to be mounted over the toggle actuator of a light switch and to control a load control device via wireless communication. The remote control device may include a base portion and a rotating portion supported by the base portion so as to be rotatable about the base portion. The remote control device may include a control circuit and a wireless communication circuit. The control circuit may be operably coupled to the rotating portion and to the wireless communication circuit. The control circuit may be configured to translate a force applied to the rotating portion of the remote control device into a control signal and to cause the communication circuit to transmit the control signal to the load control device.

29 Claims, 7 Drawing Sheets

Related U.S. Application Data continuation of application No. 13/829,981, filed on Mar. 14, 2013, now Pat. No. 9,565,742.

(60) Provisional application No. 61/718,818, filed on Oct. 26, 2012.

(51) Int. Cl.
*H01H 3/02* (2006.01)
*H05B 47/11* (2020.01)
*G08C 17/02* (2006.01)

(52) U.S. Cl.
CPC ......... *G08C 17/02* (2013.01); *H01H 2300/03* (2013.01); *Y02B 20/40* (2013.01); *Y02B 90/20* (2013.01); *Y04S 20/14* (2013.01); *Y10T 29/49117* (2015.01)

(56) References Cited

U.S. PATENT DOCUMENTS

| | | | |
|---|---|---|---|
| 5,162,665 A | 11/1992 | Troyen | |
| 5,189,412 A | 2/1993 | Mehta et al. | |
| 5,239,205 A | 8/1993 | Hoffman et al. | |
| 5,264,761 A | 11/1993 | Johnson | |
| 5,281,699 A | 1/1994 | Chang | |
| 5,340,954 A | 8/1994 | Hoffman et al. | |
| 5,458,311 A | 10/1995 | Holbrook | |
| 5,739,775 A | 4/1998 | Brandestini | |
| 5,744,913 A | 4/1998 | Martich et al. | |
| 5,818,128 A | 10/1998 | Hoffman et al. | |
| 5,905,442 A | 5/1999 | Mosebrook et al. | |
| 5,955,796 A * | 9/1999 | Nilssen | G04F 1/005 307/140 |
| 5,962,992 A | 10/1999 | Huang et al. | |
| 6,270,239 B1 | 8/2001 | Sund | |
| 6,389,139 B1 | 5/2002 | Curtis et al. | |
| 6,400,103 B1 | 6/2002 | Adamson | |
| 6,528,954 B1 | 3/2003 | Lys et al. | |
| 6,608,253 B1 | 8/2003 | Rintz | |
| 6,784,383 B2 | 8/2004 | Sugahara et al. | |
| 6,828,517 B2 | 12/2004 | Calkin et al. | |
| 6,828,733 B1 | 12/2004 | Crenshaw | |
| 7,092,772 B2 | 8/2006 | Murray et al. | |
| 7,161,311 B2 | 1/2007 | Mueller et al. | |
| 7,462,997 B2 | 12/2008 | Mueller et al. | |
| 7,486,883 B2 | 2/2009 | McNary | |
| 7,573,208 B2 | 8/2009 | Newman, Jr. | |
| 7,597,455 B2 | 10/2009 | Smith et al. | |
| 7,791,289 B2 | 9/2010 | Oosterbaan et al. | |
| 7,834,856 B2 | 11/2010 | Grinshpoon et al. | |
| 7,872,423 B2 | 1/2011 | Biery et al. | |
| 7,940,167 B2 | 5/2011 | Steiner et al. | |
| 8,008,866 B2 | 8/2011 | Newman, Jr. et al. | |
| 8,009,042 B2 | 8/2011 | Steiner et al. | |
| 8,013,545 B2 | 9/2011 | Jonsson | |
| 8,033,686 B2 | 10/2011 | Recker et al. | |
| 8,120,279 B2 | 2/2012 | Oosterbaan et al. | |
| 8,124,898 B2 | 2/2012 | Mathew et al. | |
| 8,199,010 B2 | 6/2012 | Sloan et al. | |
| 8,212,486 B2 | 7/2012 | Biery et al. | |
| 8,217,915 B2 | 7/2012 | Philipp | |
| 8,228,184 B2 | 7/2012 | Blakeley et al. | |
| 8,274,233 B2 | 9/2012 | Altonen et al. | |
| 8,330,638 B2 | 12/2012 | Altonen et al. | |
| 8,344,639 B1 | 1/2013 | Bahrehmand | |
| 8,362,713 B2 | 1/2013 | Recker et al. | |
| 8,384,293 B2 | 2/2013 | Liao | |
| 8,410,706 B2 | 4/2013 | Steiner et al. | |
| 8,427,061 B2 | 4/2013 | Biery et al. | |
| 8,451,116 B2 | 5/2013 | Steiner et al. | |
| 8,508,148 B1 | 8/2013 | Carley et al. | |
| 8,575,851 B2 | 11/2013 | Bahrehmand | |
| 8,669,484 B1 * | 3/2014 | Benson | H01H 3/26 200/38 R |
| 8,758,031 B2 | 6/2014 | Cheng et al. | |
| 8,786,196 B2 | 7/2014 | Biery et al. | |
| 8,823,266 B2 | 9/2014 | Qin | |
| 9,122,320 B1 | 9/2015 | Rowles et al. | |
| 9,148,937 B2 | 9/2015 | Steiner et al. | |
| 9,208,965 B2 | 12/2015 | Busby et al. | |
| 9,250,669 B2 | 2/2016 | Blakeley et al. | |
| 9,418,802 B2 | 8/2016 | Romano et al. | |
| 9,520,247 B1 | 12/2016 | Finnegan et al. | |
| 9,544,977 B2 | 1/2017 | Economy et al. | |
| 9,565,742 B2 | 2/2017 | Swatsky et al. | |
| 9,583,288 B2 | 2/2017 | Jones et al. | |
| 9,633,557 B2 | 4/2017 | Dimberg et al. | |
| 9,799,469 B2 | 10/2017 | Bailey et al. | |
| 9,959,997 B2 | 5/2018 | Bailey et al. | |
| 2002/0154025 A1 | 10/2002 | Ling | |
| 2002/0195975 A1 | 12/2002 | Schanberger et al. | |
| 2005/0077837 A1 | 4/2005 | Kim et al. | |
| 2005/0285538 A1 | 12/2005 | Jaworski et al. | |
| 2006/0273741 A1 | 12/2006 | Stalker, III | |
| 2007/0145915 A1 | 6/2007 | Roberge et al. | |
| 2008/0111491 A1 | 5/2008 | Spira | |
| 2008/0302873 A1 | 12/2008 | Kotlarsky et al. | |
| 2008/0303661 A1 | 12/2008 | Chick | |
| 2008/0315798 A1 | 12/2008 | Diederiks et al. | |
| 2009/0059603 A1 | 3/2009 | Recker et al. | |
| 2009/0069081 A1 | 3/2009 | Thorner | |
| 2009/0184652 A1 | 7/2009 | Bollinger, Jr. et al. | |
| 2009/0206769 A1 | 8/2009 | Biery et al. | |
| 2009/0206983 A1 | 8/2009 | Knode et al. | |
| 2009/0251352 A1 | 10/2009 | Altonen et al. | |
| 2009/0288937 A1 * | 11/2009 | Agronin | H01H 3/227 200/331 |
| 2010/0188009 A1 | 7/2010 | Bull | |
| 2010/0255706 A1 | 10/2010 | Hsiao et al. | |
| 2010/0271802 A1 | 10/2010 | Recker et al. | |
| 2010/0295484 A1 | 11/2010 | Smith | |
| 2010/0308664 A1 | 12/2010 | Face et al. | |
| 2010/0327766 A1 | 12/2010 | Recker et al. | |
| 2011/0080114 A1 | 4/2011 | Elberbaum et al. | |
| 2011/0095687 A1 | 4/2011 | Jonsson | |
| 2011/0095709 A1 | 4/2011 | Diehl et al. | |
| 2011/0098953 A1 | 4/2011 | Jonsson | |
| 2011/0133655 A1 | 6/2011 | Recker et al. | |
| 2011/0162946 A1 | 7/2011 | Altonen et al. | |
| 2011/0187282 A1 * | 8/2011 | Biery | H05B 39/041 315/291 |
| 2012/0025717 A1 | 2/2012 | Klusmann et al. | |
| 2012/0068611 A1 | 3/2012 | Steiner et al. | |
| 2012/0080944 A1 | 4/2012 | Recker et al. | |
| 2012/0136485 A1 | 5/2012 | Weber et al. | |
| 2012/0163828 A1 | 6/2012 | Lindberg et al. | |
| 2012/0187835 A1 | 7/2012 | Jonsson | |
| 2012/0280793 A1 | 11/2012 | Fayfield et al. | |
| 2012/0286672 A1 | 11/2012 | Holland et al. | |
| 2012/0286689 A1 | 11/2012 | Newman, Jr. et al. | |
| 2012/0286940 A1 | 11/2012 | Carmen, Jr. et al. | |
| 2012/0292174 A1 * | 11/2012 | Mah | H01H 3/227 200/573 |
| 2012/0306376 A1 | 12/2012 | Altonen et al. | |
| 2013/0010018 A1 | 1/2013 | Economy | |
| 2013/0026947 A1 | 1/2013 | Economy et al. | |
| 2013/0181630 A1 | 7/2013 | Taipale et al. | |
| 2013/0222122 A1 | 8/2013 | Killo et al. | |
| 2013/0257315 A1 | 10/2013 | Restrepo et al. | |
| 2014/0001977 A1 | 1/2014 | Zacharchuk et al. | |
| 2014/0117859 A1 | 5/2014 | Swatsky et al. | |
| 2014/0117871 A1 | 5/2014 | Swatsky et al. | |
| 2015/0077021 A1 * | 3/2015 | Smith | H05B 47/19 315/362 |
| 2015/0123681 A1 | 5/2015 | Park | |
| 2015/0373796 A1 | 12/2015 | Bahrehmand | |
| 2016/0073479 A1 | 3/2016 | Erchak et al. | |
| 2017/0071049 A1 | 3/2017 | Swatsky et al. | |
| 2017/0105176 A1 | 4/2017 | Finnegan et al. | |
| 2018/0190451 A1 | 7/2018 | Scruggs | |

(56) References Cited

U.S. PATENT DOCUMENTS

FOREIGN PATENT DOCUMENTS

| JP | 2007-242566 A | 9/2007 |
|---|---|---|
| WO | WO 2002/025842 A2 | 3/2002 |
| WO | WO 2007/072296 A1 | 6/2007 |

* cited by examiner

BATTERY-POWERED RETROFIT REMOTE CONTROL DEVICE

CROSS REFERENCE TO RELATED APPLICATIONS

This application is a continuation of U.S. patent application Ser. No. 15/386,869, filed Dec. 21, 2016, now U.S. Pat. No. 10,147,560, issued on Dec. 4, 2018, which is a continuation of U.S. patent application Ser. No. 13/829,981, filed Mar. 14, 2013, now U.S. Pat. No. 9,565,742, issued on Feb. 7, 2017, which claims the benefit of provisional U.S. Patent Application No. 61/718,818, filed Oct. 26, 2012, the contents of which are incorporated herein by reference in their respective entireties.

BACKGROUND

In prior art load control systems, standard mechanical toggle switches are often replaced by more advanced load control devices (such as dimmer switches) that control the amount of power delivered from an AC power source to an electrical load. This procedure requires that the old mechanical toggle switch be un-wired and removed from the load control system and the new load control device to be connected to the electrical wiring. Typically, such a procedure must be performed by an electrical contractor or other skilled installer. The average consumer may not feel comfortable to complete the installation of the load control device. Accordingly, there is a need for a load control system that may be installed in an existing installation having a mechanical toggle switch without requiring any electrical work.

SUMMARY

As described herein, a remote control device may provide a simple retrofit solution for an existing switched control system. Implementation of the remote control device, for example in an existing switched control system, may enable energy savings and/or advanced control features, for example without requiring any electrical re-wiring and/or without requiring the replacement of any existing mechanical switches.

The remote control device may be configured to control an electrical load, such as a lighting load. The remote control device may be configured to be mounted over the toggle actuator of an existing mechanical switch that controls whether power is delivered to the electrical load.

The remote control device may be configured to maintain the toggle actuator in an on position when mounted over the toggle actuator, such that a user of the remote control device is not able to mistakenly switch the toggle actuator to the off position, which may cause the electrical load to be unpowered such that the electrical load cannot be controlled by one or more remote control devices. The remote control device may be configured to control multiple types of electrical loads on a single electrical circuit (e.g., substantially in unison). A load control system may include multiple remote control devices that are configured to provide individual (e.g., zoned) control of each of a plurality of electrical loads coupled to a single electrical circuit.

The remote control device may be configured to control a load control device of a load control system without requiring access to the electrical wiring of the load control system. An electrical load may be electrically connected to the load control device such that the load control device may control an amount of power delivered to the electrical load. The electrical load may include a toggle actuator configured to switch electrical power to the electrical load on and/or off.

The remote control device may be configured to be attached to the toggle actuator. For example, the remote control device may be configured to mount over a portion of the toggle actuator. The remote control device may include a base portion and an intensity adjustment actuator operatively attached to the base portion and configured to move relative to the base portion. The intensity adjustment actuator may be a rotating portion supported by the base portion and rotatable about the base portion. The intensity adjustment actuator may be a slider supported by the base portion and configured to slide relative to the base portion. The remote control device may be configured such that the base portion does not actuate the actuator of the electrical load when a force is applied to the rotating portion.

The remote control device may include a control circuit and a wireless communication circuit. The control circuit may be operatively connected to the intensity adjustment actuator of the remote control device. The control circuit may be communicatively connected to the intensity adjustment actuator of the remote control device and to the wireless communication circuit.

The control circuit may be configured to translate a force applied to the intensity adjustment actuator of the remote control device into a control signal for the load control device. The control circuit may, responsive to the application of a force to the intensity adjustment actuator of the remote control device, generate one or more control signals and may cause the communication circuit to transmit the one or more control signals, for example to the load control device.

A load control system may include a mechanical switch coupled in series electrical connection between an alternating current (AC) power source and a socket. The load control system may be retrofitted for wireless control. Retrofitting the load control system for wireless control may include installing a controllable light source in the socket. Retrofitting the load control system for wireless control may include mounting a remote control device over a toggle actuator of the mechanical switch. Retrofitting the load control system for wireless control may include associating the controllable light source and the remote control device with each other, such that the controllable light source is responsive to a signal transmitted to the controllable light source by the remote control device via wireless communication. The toggle switch may be operated to an on position prior to mounting the remote control device over the toggle actuator, for example such that the controllable light source is electrically coupled to the AC power source. Associating the controllable light source and the remote control device with each other may include actuating respective actuators of the controllable light source and the remote control device.

DETAILED DESCRIPTION

Figure 1:
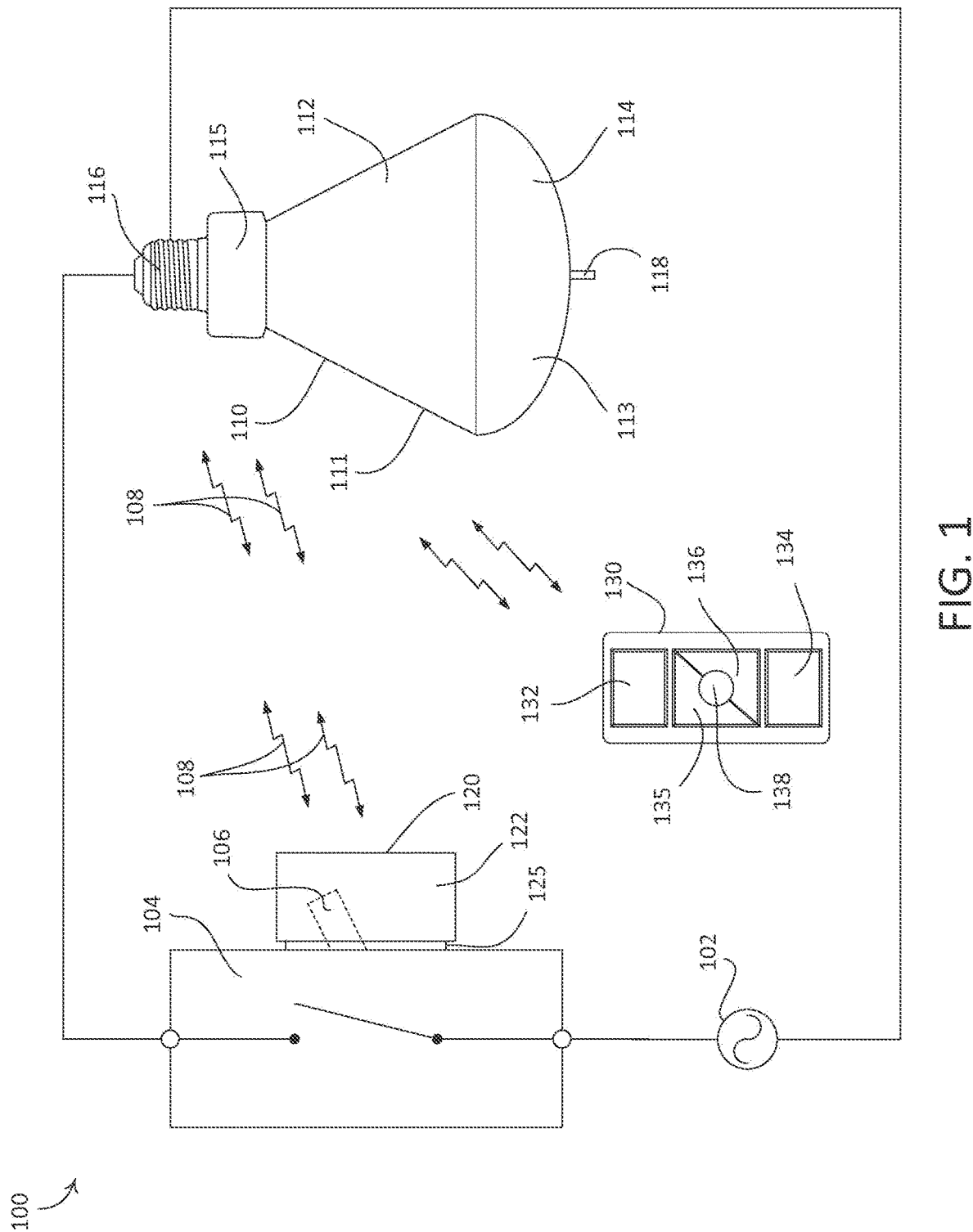
FIG. 1 depicts an example load control system.

FIG. 1 depicts an example load control system 100. As shown, the load control system 100 is configured as a lighting control system that includes a controllable light source 110 and a battery-powered remote control device 120, for example a rotary remote control device. The remote control device 120 includes a wireless transmitter. The load control system 100 includes a standard, single pole single throw (SPST) maintained mechanical switch 104 (i.e., a "toggle switch" or a "light switch") that may be in place prior to installation of the remote control device 120 (e.g., pre-existing in the load control system 100). The switch 104 is coupled in series electrical connection between an alternating current (AC) power source 102 and the controllable light source 110. The switch 104 includes a toggle actuator 106 that may be actuated to toggle, for example to turn on and/or turn off, the controllable light source 110. The controllable light source 110 is electrically coupled to the AC power source 102 when the switch 104 is closed (i.e., conductive), and is disconnected from the AC power source 102 when the switch 104 is open (i.e., nonconductive).

The remote control device 120 is configured to be attached to the toggle actuator 106 of the switch 104 when the toggle actuator 106 is in the on position (which is typically pointing upwards) and the switch 104 is closed (i.e., conductive). As shown, the remote control device 120 includes a base portion 125 configured to be mounted over the toggle actuator 106 of the switch 104. The base portion 125 may operate to maintain the toggle actuator 106 in the on position, such that a user is not able to switch the toggle actuator 106 to the off position, which may disconnect the controllable light source 110 from the AC power source 102.

The remote control device 120 may be operable to transmit wireless signals, for example radio frequency (RF) signals 108, to the controllable light source 110 for controlling the intensity of the controllable light source 110. The controllable light source 110 may be associated with the remote control device 120 during a configuration procedure of the load control system 100, such that the controllable light source 110 is then responsive to the RF signals 108 transmitted by the remote control device 120. An example of a configuration procedure for associating a remote control device with a load control device is described in greater detail in commonly-assigned U.S. Patent Publication No. 2008/0111491, published May 15, 2008, entitled "Radio-Frequency Lighting Control System," the entire disclosure of which is hereby incorporated by reference.

Figure 2:
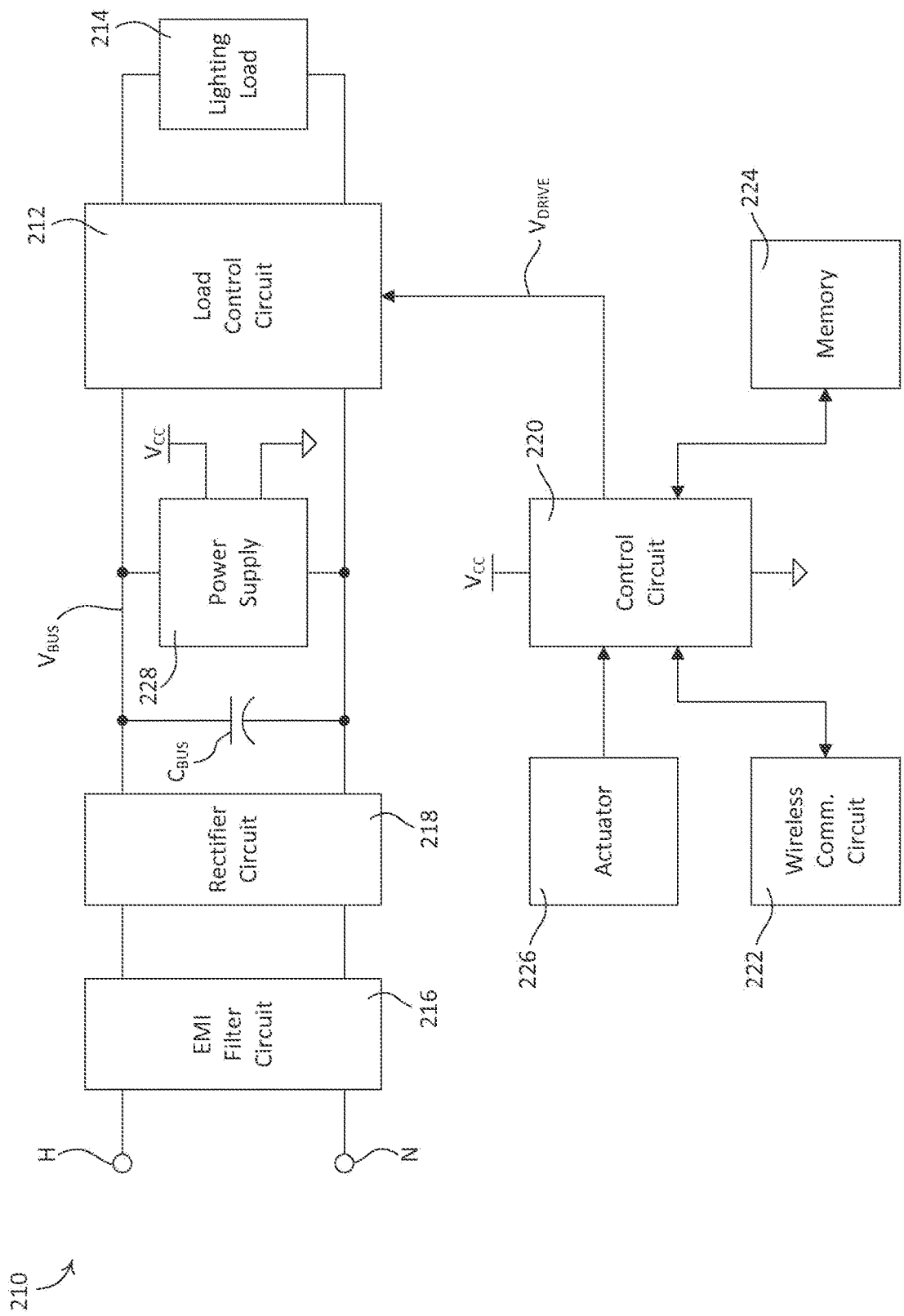
FIG. 2 is a simplified block diagram of an example controllable light source.

The controllable light source 110 may include a lighting load, for example the lighting load 214 shown in FIG. 2, such as an incandescent lamp, a halogen lamp, a compact fluorescent lamp, a light-emitting diode (LED) light engine, or other suitable light source. The controllable light source 110 includes a housing 111 that defines an end portion 114 and an intermediate portion 112. The housing 111 may be made of any suitable material, for example glass. The lighting load may be integral with and/or substantially enclosed by the housing 111. For example, the lighting load may be located inside of the intermediate portion 112 of the housing 111.

The controllable light source 110 may be configured such that light emitted from the lighting load shines through at least a portion of the housing 111. As shown, the intermediate portion 112 is configured to be reflective, such that the intermediate portion 112 functions as a reflector portion of the housing 111. The intermediate portion 112 may include one or more reflective surfaces. The end portion 114 is configured as a light emitting portion configured to shine light emitted by the lighting load out of the housing 111. The end portion 114 may be transparent or translucent. The end portion 114 of the housing 111 may define an end surface 113. The housing 111 may define any suitable shape, for example the illustrated bulb shape. As shown, the end portion 114 defines a convex, domed shape, but may be configured to define any other suitable shape, for example flat. The housing 111 is not limited to the illustrated configuration of shining light emitted by the lighting load. For example, the housing 111 may be configured to shine light emitted from the lighting load through the intermediate portion 112 (e.g., at least a part of the intermediate portion 112) and/or the end portion 114 (e.g., at least a part of the end portion 114).

As shown, the controllable light source 110 includes an enclosure 115 that is configured to house one or more electrical components of the controllable light source 110, such as an integral load control circuit (e.g., the load control circuit 212 shown in FIG. 2), for controlling the intensity of the lighting load between a low end intensity (e.g., approximately 1%) and a high-end intensity (e.g., approximately 100%). The controllable light source 110 may include a wireless communication circuit (e.g., wireless communication circuit 222 shown in FIG. 2) housed inside the enclosure 115, such that the controllable light source 110 may be operable to receive the RF signals 108 transmitted by the remote control device 120 and control the intensity of the lighting load in response to the received RF signals. As shown, the enclosure 115 is attached to the intermediate portion 112 of the housing 111 and may function as an enclosure portion of the housing 111. Alternatively, the enclosure 115 may be integral with, for example monolithic with, the housing 111, such that the enclosure 115 defines an enclosure portion of the housing 111.

The controllable light source 110 may be configured as a screw-in, controllable light source. As shown, the controllable light source 110 includes a screw-in base 116 that is configured to be screwed into a standard Edison socket, such that the controllable light source may be coupled to the AC power source 102. The screw-in base 116 may be attached to the enclosure 115. The controllable light source 110 may be configured as a downlight (e.g., as shown in FIG. 1) that may be installed in a recessed light fixture. Alternatively, the controllable light source 110 may be configured as an A type lamp or any other type of screw-in lamp, for example. The controllable light source 110 is not limited to the illustrated screw-in base 116, and may include any suitable base, for example a bayonet-style base or other suitable base providing electrical connections. Examples of screw-in luminaires are described in greater detail in commonly assigned U.S. Pat. No. 8,008,866, issued Aug. 30, 2011, entitled "Hybrid Light Source," and U.S. Patent Application Publication No. 2012/0286689, published Nov. 15, 2012, entitled "Dimmable Screw-In Compact Fluorescent Lamp Having Integral Electronic Ballast Circuit," the entire disclosures of which are hereby incorporated by reference.

The controllable light source 110 may further comprise a transparent (e.g., translucent) actuator 118, such as a clear button, that may be pressed to associate the controllable light source with the remote control device 120. The actuator 118 may protrude from the end portion 114 of the housing 111, for example below the end surface 113, such that the actuator 118 may be pressed when the controllable light source 110 is installed, for example in a recessed downlight fixture. Alternatively, the actuator 118 may be flush with the end surface 113 of the end portion 114 or may be recessed in the end surface 113 of the end portion 114 (e.g., such that the actuator 118 may be actuated by a tool, such as a screwdriver). When the controllable light source 110 is installed in a recessed downlight fixture, the intermediate portion 112 (e.g., the reflector portion) of the housing 111 and the enclosure 115 may be substantially enclosed within the downlight fixture, and at least a portion of the end portion 114, for example the end surface 113, may not be enclosed by the downlight fixture, such that actuator 118 may be actuated. The actuator 118 may alternatively be positioned along a perimeter of the end portion 114. Alternatively, the controllable light source 110 may include an actuator supported by the enclosure 115 that may be actuated when the end portion 114, for example the end surface 113, is pressed towards the screw-in base 116. The end surface 113, and/or another surface of the controllable light source 110, may alternatively include a touch sensitive surface, for example a resistive, capacitive, or other touch sensitive surface that may be touched to associate the controllable light source 110 with the remote control device 120.

The actuator 118 may be configured to be rotated to adjust a selectable maximum power rating of the controllable light source 110, such that the controllable light source 110 operates the lighting load at the maximum power rating when the remote control device 120 controls the intensity of the controllable light source to the high-end intensity. The remote control device 120 may then be operable to control the controllable light source 110 to dim the intensity of the lighting load below the high-end intensity down to the low-end intensity.

The load control system 100 may also include one or more other devices configured to wirelessly communicate with the controllable light source 110. As shown, the load control system 100 includes a handheld, battery-powered, remote control device 130 for controlling the controllable light source 110. The remote control device 130 may include one or more buttons, for example, an on button 132, an off button 134, a raise button 135, a lower button 136, and a preset button 138, as shown in FIG. 1. The remote control device 130 may include a wireless communication circuit (not shown) for transmitting digital messages (e.g., including commands to control the lighting load) to the controllable light source 110, for example via the RF signals 108, responsive to actuations of one or more of the buttons 132, 134, 135, 136, and 138. Alternatively, the remote control device 130 may be mounted to a wall or supported by a pedestal, for example a pedestal configured to be mounted on a tabletop. Examples of handheld battery-powered remote controls are described in greater detail in commonly assigned U.S. Pat. No. 8,330,638, issued Dec. 11, 2012, entitled "Wireless Battery Powered Remote Control Having Multiple Mounting Means," and U.S. Pat. No. 7,573,208, issued Aug. 22, 1009, entitled "Method Of Programming A Lighting Preset From A Radio-Frequency Remote Control," the entire disclosures of which are hereby incorporated by reference.

The load control system 100 may also include one or more of a remote occupancy sensor or a remote vacancy sensor (not shown) for detecting occupancy and/or vacancy conditions in a space surrounding the sensors. The occupancy or vacancy sensors may be configured to transmit digital messages to the controllable light source 110, for example via the RF signals 108, in response to detecting occupancy or vacancy conditions. Examples of RF load control systems having occupancy and vacancy sensors are described in greater detail in commonly-assigned U.S. Pat. No. 7,940,167, issued May 10, 2011, entitled "Battery Powered Occupancy Sensor," U.S. Pat. No. 8,009,042, issued Aug. 30, 2011, entitled "Radio Frequency Lighting Control System With Occupancy Sensing," and U.S. Pat. No. 8,199,010, issued Jun. 12, 2012, entitled "Method And Apparatus For Configuring A Wireless Sensor," the entire disclosures of which are hereby incorporated by reference.

The load control system 100 may include a remote daylight sensor (not shown) for measuring a total light intensity in the space around the daylight sensor. The daylight sensor may be configured to transmit digital messages, such as a measured light intensity, to the controllable light source 110, for example via the RF signals 108, such that the controllable light source 110 is operable to control the intensity of the lighting load in response to the measured light intensity. Examples of RF load control systems having daylight sensors are described in greater detail in commonly assigned U.S. patent application Ser. No. 12/727,956, filed Mar. 19, 2010, entitled "Wireless Battery-Powered Daylight Sensor," and U.S. patent application Ser. No. 12/727,923, filed Mar. 19, 2010, entitled "Method Of Calibrating A Daylight Sensor," the entire disclosures of which are hereby incorporated by reference.

The load control system 100 may include other types of input devices, for example, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, kinetic or solar-powered remote controls, key fobs, cell phones, smart phones, tablets, personal digital assistants, personal computers, laptops, time clocks, audio-visual controls, safety devices, power monitoring devices (such as power meters, energy meters, utility submeters, utility rate meters), central control transmitters, residential, commercial, or industrial controllers, or any combination of these input devices.

Figure 3:
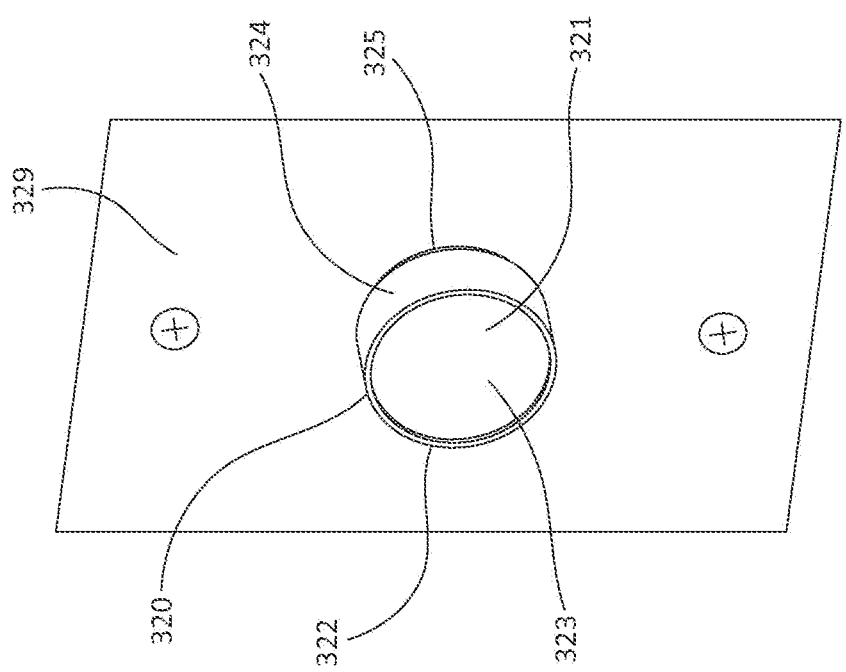
FIG. 3 is a perspective view of an example rotary remote control device attached to a switch.

During the configuration procedure of the load control system 100, the controllable light source 110 may be associated with a wireless control device, for example the remote control device 120, by actuating the actuator 118 on the controllable light source 110 and then actuating (e.g., pressing and holding) an actuator on the wireless remote control device (e.g., a rotating portion 322 of a rotary remote control device 320 shown in FIG. 3) for a predetermined amount of time (e.g., approximately 10 seconds).

Digital messages transmitted by the remote control device 120, for example directed to the controllable light source 110, may include a command and identifying information, such as a unique identifier (e.g., a serial number) associated with the remote control device 120. After being associated with the remote control device 120, the controllable light source 110 may be responsive to messages containing the unique identifier of the remote control device 120. The controllable light source 110 may be associated with one or more other wireless control devices of the load control system 100 (i.e., the remote control device 130, the occupancy sensor, the vacancy sensor, and/or the daylight sensor), for example using similar association process.

After a remote control device, for example the remote control device 120 or the remote control device 130, is associated with the controllable light source 110, the remote control device may be used to associate the controllable light source 110 with the occupancy sensor, the vacancy sensor, and/or the daylight sensor, without actuating the actuator 118 of the controllable light source 110, for example as described in greater detail in commonly-assigned U.S. patent application Ser. No. 13/598,529, filed Aug. 29, 2012, entitled "Two Part Load Control System Mountable To A Single Electrical Wallbox," the entire disclosure of which is hereby incorporated by reference.

When the remote control device 120 is mounted over the toggle actuator of a switch (e.g., the toggle actuator 106), the base portion 125 may function to secure the toggle actuator 106 from being toggled. For example, the base portion 125 may be configured to maintain the toggle actuator 106 in an on position, such that a user of the remote control device 120 is not able to mistakenly switch the toggle actuator 106 to the off position, which may disconnect the controllable light source 110 from the AC power source 102, such that controllable light source 110 may not be controlled by one or more remote control devices of the load control system 100 (e.g., the remote control devices 120 and/or 130), which may in turn cause user confusion.

As shown, the remote control device 120 is battery-powered, not wired in series electrical connection between the AC power source 102 and the controllable light source 110 (e.g., does not replace the mechanical switch 104), such that the controllable light source 110 receives a full AC voltage waveform from the AC power source 102 (i.e., the controllable light source 110 does not receive a phase-control voltage that may be created by a standard dimmer switch). Because the controllable light source 110 receives the full AC voltage waveform, multiple controllable light sources (e.g., controllable light sources 110) may be coupled in parallel on a single electrical circuit (e.g., coupled to the mechanical switch 104). The multiple controllable light sources may include light sources of different types (e.g., incandescent lamps, fluorescent lamps, and/or LED light sources). The remote control device 120 may be configured to control one or more of the multiple controllable light sources, for example substantially in unison. In addition, if there are multiple controllable light sources coupled in parallel on a single circuit, each controllable light source may be zoned, for example to provide individual control of each controllable light source. For example, a first controllable light 110 source may be controlled by the remote control device 120, while a second controllable light source 110 may be controlled by the remote control device 130. In prior art systems, a mechanical switch (such as the switch 104, for example) typically controls such multiple light sources in unison (e.g., turns them on and/or off together).

The controllable light source 110 and the remote control device 120 may be part of a larger RF load control system than that shown in FIG. 1. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and U.S. patent application Ser. No. 12/033,223, filed Feb. 19, 2008, entitled "Communication Protocol For A Radio Frequency Load Control System," the entire disclosures of which are both hereby incorporated by reference.

While the load control system 100 was described with reference to the single-pole system shown in FIG. 1, one or both of the controllable light source 110 and the remote control device 120 may be implemented in a "three-way" lighting system having two single-pole double-throw (SPDT) mechanical switches (i.e., a "three-way" switch) for controlling a single electrical load. For example, the system could comprise two remote control devices 120, with one remote control device 120 connected to the toggle actuator of each SPDT switch. The toggle actuators of each SPDT switch would be positioned, such that the SPDT switches form a complete circuit between the AC source and the electrical load before the remote control devices 120 are installed on the toggle actuators.

The load control system 100 shown in FIG. 1 may provide a simple retrofit solution for an existing switched control system. The load control system 100 may provide energy savings and/or advanced control features, for example without requiring any electrical re-wiring and/or without requiring the replacement of any existing mechanical switches. To install and use the load control system 100 of FIG. 1, a consumer may replace an existing lamp with the controllable light source 110, switch the toggle actuator 106 of the mechanical switch 104 to the on position, install (e.g., mount) the remote control device 120 onto the toggle actuator 106, and associate the remote control device 120 and the controllable light source 110 with each other, for example as described above.

FIG. 2 is a simplified block diagram of an example controllable light source 210 that may be deployed as, for example, the controllable light source 110 of the load control system 100 shown in FIG. 1. As shown, the controllable light source 210 includes a hot terminal H and a neutral terminal N that are configured to be electrically coupled to an AC power source, such as the AC power source 102, for example via the screw-in base 116.

The controllable light source 210 includes a lighting load 214 and a load control circuit 212 for controlling the intensity of the lighting load 214. The controllable light source 210 includes an electromagnetic interference (EMI) filter 216 that may operate to mitigate (e.g., prevent) noise generated by the load control circuit 212 from being conducted on the AC mains wiring. The controllable light source 210 may include a rectifier circuit 218 for generating a direct-current (DC) bus voltage VBus across a bus capacitor CBus. As shown, the load control circuit 212 receives the bus voltage VBus and regulates the power delivered to the lighting load 214 in order to control the intensity of the lighting load 214. For example, the load control circuit 212 for controlling the lighting load 214 may include a dimmer circuit for an incandescent lamp, an electronic ballast circuit for a compact fluorescent lamp (CFL), a light-emitting diode (LED) driver for an LED light engine, or the like.

The controllable light source 210 includes a control circuit 220 operatively coupled to the load control circuit 212. The control circuit 220 may operate to control the intensity of the lighting load 214. The control circuit 220 may include one or more of a processor (e.g., a microprocessor), a microcontroller, a programmable logic device (PLD), a field programmable gate array (FPGA), an application specific integrated circuit (ASIC), or any suitable processing device.

The controllable light source 210 includes a wireless communication circuit 222, for example an RF receiver coupled to an antenna for receiving the RF signals 108 from wireless remote control devices, such as the remote control device 120, the remote control device 130, the occupancy sensor, and the daylight sensor of the load control system 100 shown in FIG. 1. Alternatively, the wireless communication circuit 222 may include an RF transmitter for transmitting RF signals, an RF transceiver for transmitting and receiving RF signals, or an infrared (IR) receiver for receiving IR signals.

The controllable light source 210 includes a memory 224 communicatively coupled to the control circuit 220. The control circuit 220 may be configured to use the memory 224 for the storage and/or retrieval of, for example, unique identifiers (e.g., serial numbers) of the wireless remote control devices to which the controllable light source 210 is responsive. The memory 224 may be implemented as an external integrated circuit (IC) or as an internal circuit of the control circuit 220.

The controllable light source 210 includes an actuator 226 that is operatively coupled to the control circuit 220. The actuator 226 may be actuated to associate the controllable light source 210 with one or more of the wireless remote control devices. For example, the actuator 226 may be mechanically coupled to the actuator 118 shown in FIG. 1.

The controllable light source 210 includes a power supply 228 coupled to the bus voltage VBus for generating a DC supply voltage $V_{CC}$. The supply voltage $V_{CC}$ may be used to power one or more of the control circuit 220, the wireless communication circuit 222, the memory 224, and other low-voltage circuitry of the controllable light source 210.

The controllable light source 210 may include an integral occupancy sensing circuit (not shown) configured to detect occupancy and/or vacancy conditions in a space surrounding the controllable light source 210, for example in a similar manner as the remote occupancy sensor described above with reference to FIG. 1. The control circuit 220 may be configured to control the lighting load 214 in response to occupancy and vacancy conditions detected by the occupancy sensing circuit.

The controllable light source 210 may include an integral daylight (or ambient light) sensing circuit (not shown) configured to measure a light intensity (e.g., a total light intensity) in a space around the controllable light source 210, for example in a similar manner as the remote daylight sensor described above with reference to FIG. 1. The control circuit 220 may be configured to control the lighting load 214 in response to light intensity measured by the daylight sensing circuit.

The controllable light source 210 may include an integral power measurement circuit (not shown) configured to measure a total amount of power consumed by the lighting load 214 and/or the controllable light source 210. The control circuit 220 may be configured to control the lighting load 214 in response to power consumption measured by the power measurement circuit and/or to cause the wireless communication circuit 222 to transmit one or more RF signals that may include information pertaining to a measured power consumption. A load control device capable of power measurement is described in greater detail in commonly-assigned U.S. patent application Ser. No. 13/793,308, filed Mar. 11, 2013, entitled "Power Measurement in a Two-Wire Load Control Device," the entire disclosure of which is hereby incorporated by reference.

Figure 4:
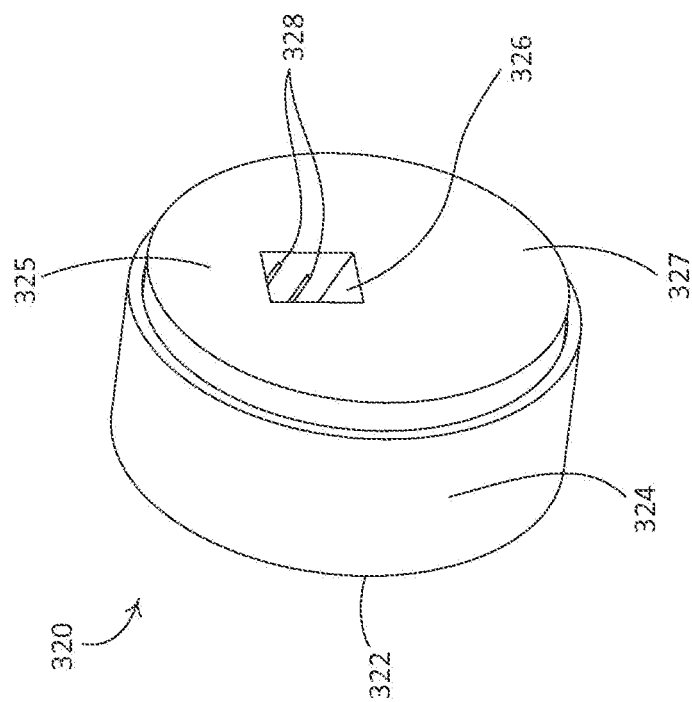
FIG. 4 is a perspective view of the rotary remote control device depicted in FIG. 3, detached from the switch.

FIGS. 3 and 4 are perspective views of an example rotary remote control device 320 that may deployed as, for example, the remote control device 120 of the load control system 100 shown in FIG. 1. As shown, the rotary remote control device 320 is configured to be mounted over the toggle actuator of a mechanical switch, for example the toggle actuator 106 of the switch 104 as shown in FIG. 1, over which a standard, traditional-style faceplate 329 is installed.

As shown, the rotary remote control device 320 includes an intensity adjustment actuator, configured as a rotating portion 322 that may be moved for example rotated, with respect to a base portion 325. One or more components of the rotary remote control device 320, for example the rotating portion 322 and the base portion 325, may be made of any suitable material, such as plastic. The rotating portion 322 may be supported by the base portion 325 so as to be rotatable in opposed directions about the base portion 325, for example in the clockwise or counter-clockwise directions.

The illustrated rotating portion 322 includes a body that defines a disc-shaped front portion 321 and an annular side portion 324 that extends around an entirety of an outer perimeter of the front portion 321. The front portion 321 defines a front surface 323. The front portion 321 of the rotating portion 322 may be made of a translucent material, so as to allow a night light that may be located in a toggle actuator to which the rotary remote control device 320 is attached to shine through the front portion 321. Alternatively, the rotary remote control device 320 may include an internal night light circuit, for example, as described in greater detail in commonly-assigned U.S. Patent Application Publication No. 2012/0286940, published Nov. 15, 2012, entitled "Control Device Having a Night Light," the entire disclosure of which is hereby incorporated by reference. The rotary remote control device 320 may be configured to be mounted on a mechanical switch having a designer-style faceplate or other faceplate style.

The base portion 325 may be configured to be attached to the faceplate 329. For example, the base portion may define a rear surface 327 configured to be attached to the faceplate 329. With the rotating portion 322 rotatably attached to the base portion 325, the rear surface 327 of the base portion 325 may protrude inwardly beyond a lower edge of the side portion 324. The base portion 325 defines an opening 326 that extends into the rear surface 327. The opening 326 is dimensioned to receive at least a portion of the toggle actuator of a switch, for example the toggle actuator 106 of the switch 104 as shown in FIG. 1.

The base portion 325 may be configured to be fixedly (e.g., permanently) attached to the toggle actuator or may be configured to be removably attached to the toggle actuator, so to allow access to the toggle actuator in order to disconnect power from an electrical load controlled by the mechanical switch, for example the controllable light source 110 of the load control system 100 shown in FIG. 1. As shown, the base portion 325 defines a plurality of crush ribs 328 that extend into the opening 326, the crush ribs 328 configured to engage one or more surfaces of a toggle actuator over which the rotary remote control device 320 is mounted. The base portion 325 may be alternatively configured to attach to the toggle actuator of a switch. For example, the base portion 325 may be configured to attach to the toggle actuator via one or more mechanical fasteners, for example, a set screw, a camming clamp, or the like.

The rotary remote control device 320 may be configured to transmit wireless signals, for example RF signals, to a load control device, for example the controllable light source 110 shown in FIG. 1 or the controllable light source 210 shown in FIG. 2, for controlling the intensity of a respective lighting load, for example the lighting load 214. The rotary remote control device 320 may transmit one or more wireless signals, for example, responsive to actuations of the rotating portion 322, such as a rotational force applied to the side portion 324 of the rotating portion 322 along the clockwise or counter-clockwise directions. A controllable light source associated with the rotary remote control device 320, for example the controllable light source 110, may adjust the intensity of the lighting load in response to rotation of the rotating portion 322. The controllable light source may turn the lighting load on and off responsive to forces applied to (e.g., presses of) the front surface 323 of the front portion 321 that cause front portion 321 to be biased toward the base portion 325. A speed at which the controllable light source adjusts the intensity of the lighting load in response to the rotation of the rotating portion 322 may be a function of the rotational speed at which the rotating portion 322 is rotated. An example of a load control device responsive to a rotary actuator is described in greater detail in commonly-assigned U.S. Pat. No. 8,212,486, issued Jul. 3, 2012, entitled "Smart Load Control Device Having A Rotary Actuator," the entire disclosure of which is hereby incorporated by reference.

The rotary remote control device 320 may be configured to cause the controllable light source to "jog" the intensity of the lighting load, for example to increase or decrease intensity of the lighting load, by a predetermined amount in response to a slight rotation of the rotating portion 322 in either direction, for example a rotation of approximately 45°. The rotary remote control device 320 may be configured to cause the controllable light source to continuously adjust the intensity of the lighting load in response to the rate and/or degree of rotation of the rotating portion 322 in either direction, for example rotations greater rotation than 45°. The rotating portion 322 may be configured to return to an idle position after the rotation of the rotating portion 322. The front surface 323 of the front portion 321 of the rotating portion 322 could be marked with text and/or an image that remains upright when the rotating portion 322 is in the idle position. Alternatively, the rotary remote control device 320 may be configured such that the side portion 324 is rotatable and the front portion 321 is fixed relative to the base portion 325, such that text and/or images on the front surface 323 of the front portion 321 remain upright.

The base portion 325 may be configured to be attached (e.g., removably attached) to the faceplate 329, for example, using double sided tape affixed to the rear surface 327. Alternatively, the base portion 325 may define one or more snap fit catches (not shown) that extend inward from the base portion 325 relative to the rear surface 327 and are configured to engage within the actuator opening of a faceplate. Alternatively still, the base portion 325 may define on more apertures that extend into the rear surface 327 and a complementary faceplate (not shown) may define one or more snap fit catches configured to be received in, and engage within, the apertures in the base portion 325. Alternatively still, the base portion 325 may be configured to be magnetically attached to the faceplate.

Alternatively, the base portion 325 of the rotary remote control device 320 may be integral with a corresponding faceplate, for example the base portion 325 and the faceplate may be monolithic. Such a rotary remote control device 320 may be mounted over the toggle actuator of a switch by first removing a traditional style faceplate from the switch and replacing the traditional faceplate with the faceplate having an integrated rotary remote control device 320. Such a rotary remote control device 320 may include a solar cell affixed to the integral faceplate, the solar cell configured to charge a battery of the rotary remote control device 320 and/or to power a controller and/or an RF transmitter of the rotary remote control device 320.

Figure 5:
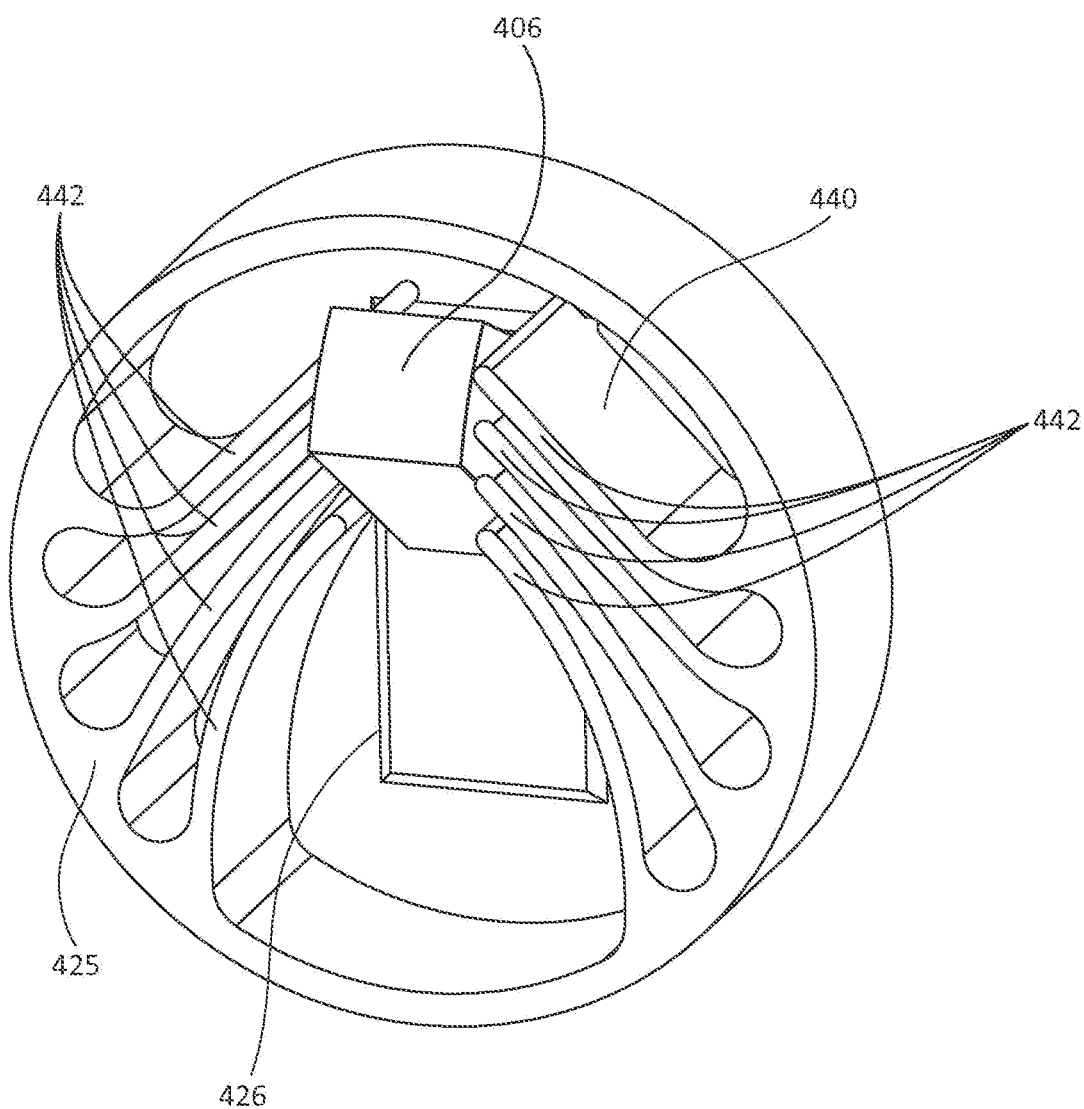
FIG. 5 is a perspective view of the base portion of an example rotary remote control device.

FIG. 5 is a perspective view of the base portion 425 of an example rotary remote control device. The base portion 425 may be deployed as, for example, the base portion 325 of the rotary remote control device 320 shown in FIGS. 3 and 4. The base portion 425 defines an opening 426 that is dimensioned to receive at least a portion of the toggle actuator 406 of a switch, for example the switch 104 as shown in FIG. 1. The base portion 425 includes a friction spring 440 configured to attach the base portion 425 to a toggle actuator 406, for example the toggle actuator 106 of the switch 104 shown in FIG. 1. The illustrated friction spring 440 includes a plurality of fingers 442 configured to capture at least a portion of the toggle actuator 406. As shown, the fingers 442 of the friction spring 440 flank opposed sides of the opening 426.

Figure 6:
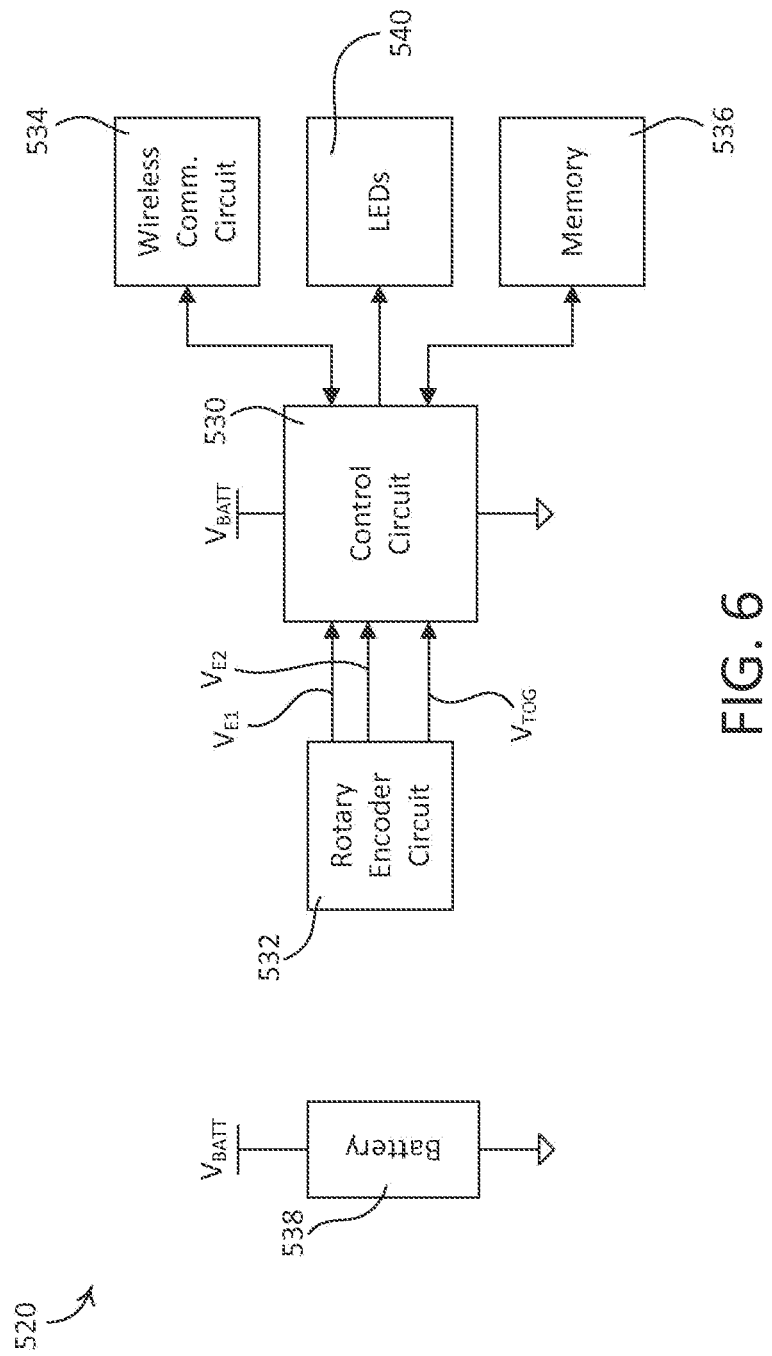
FIG. 6 is a simplified block diagram of an example rotary remote control device.

FIG. 6 is a simplified block diagram of an example rotary remote control device 520 that may be implemented as, for example, the remote control device 120 shown in FIG. 1 and/or the rotary remote control device 320 shown in FIGS. 3 and 4. As shown, the rotary remote control device 520 includes a control circuit 530. The control circuit 530 may include one or more of a processor (e.g., a microprocessor), a microcontroller, a programmable logic device (PLD), a field programmable gate array (FPGA), an application specific integrated circuit (ASIC), or any suitable processing device.

The rotary remote control device 520 includes a rotary encoder circuit 532 that may be operatively coupled to a rotary knob, for example the rotating portion 322 of the rotary remote control device 320. The control circuit 530 is communicatively coupled to the rotary encoder circuit 532. The rotary remote control device 520 includes a wireless communication circuit 534, for example an RF transmitter coupled to an antenna, for transmitting wireless signals, such as the RF signals 108, in response to actuations of the rotary knob coupled to the rotary encoder circuit 532 (e.g., the rotating portion 322 of the rotary remote control device 320). The control circuit 530 may cause the wireless communication circuit 534 to transmit one or more wireless signals to an associated load control device, for example the controllable light source 110 shown in FIG. 1 or the controllable light source 210 shown in FIG. 2, for example responsive to actuations of the rotary knob coupled to the rotary encoder circuit 532. Alternatively, the wireless communication circuit 534 may include an RF receiver for receiving RF signals, an RF transceiver for transmitting and receiving RF signals, or an infrared (IR) receiver for receiving IR signals.

The rotary remote control device 520 includes a memory 536 communicatively coupled to the control circuit 530. The control circuit 530 may be configured to use the memory 536 for the storage and/or retrieval of, for example, a unique identifier (e.g., a serial number) of the rotary remote control device 520 that may be included in the transmitted RF signals. The memory 536 may be implemented as an external integrated circuit (IC) or as an internal circuit of the control circuit 530.

The rotary remote control device 520 includes a battery 538 for producing a battery voltage $V_{BATT}$ that may be used to power one or more of the control circuit 530, the rotary encoder circuit 532, the wireless communication circuit 534, the memory 536, and other low-voltage circuitry of the rotary remote control device 520. The rotary remote control device 520 may include a solar cell (not shown) configured to charge the battery 538 and/or another energy storage device, such as a capacitor. The solar cell may be located on a surface of the rotary remote control device 520, for example on the front surface 323 of the front portion 321 of the rotating portion 322 of the rotary remote control device 320 shown in FIGS. 3 and 4.

The rotary remote control device 520 may include one or more visual indicators, for example one or more LEDs 540, that are configured to provide feedback to a user of the rotary remote control device 520. As shown, the LEDs 540 are operatively coupled to the control circuit 530. For example, the control circuit 530 may control the LEDs 540 to provide feedback indicating a status of the controllable light source 110, for example if the controllable light source 110 is on, off, or a present intensity of the controllable light source 110. The control circuit 530 may be configured to illuminate the LEDs 540 in order to provide an indication that the battery 538 is low on energy, to provide feedback during programming or association of the rotary remote control device 520, and/or to provide a night light.

In response to one or more actuations of the rotary knob coupled to the rotary encoder circuit 532, for example the rotating portion 322 of the rotary remote control device 320, the rotary encoder circuit 532 may generate three control signals that may be provided to the control circuit 530. For example, the rotary encoder circuit 532 may generate a toggle control signal $V_{TOG}$ that may be representative of instances when the front surface 323 of the front portion 321 of the rotating portion 322 is pushed towards the base portion 325, so as to toggle a controlled electrical load on and/or off. The rotary encoder circuit 532 may also generate a first encoder control signal $V_{E1}$ and a second encoder control signal $V_{E2}$. The first and second encoder control signals $V_{E1}$, $V_{E2}$ may, in combination, be representative of an angular velocity w at which the rotating portion 322 is rotated and an angular direction (e.g., clockwise or counter-clockwise) in which the rotating portion 322 is rotated.

The control circuit 530 may, responsive to receiving one or more of $V_{TOG}$, $V_{E1}$, or $V_{E2}$, cause the wireless communication circuit 534 to transmit one or more signals, for example RF signals 108, to a controllable light source associated with the rotary remote control device 520, for example the lighting load of the controllable light source 110 shown in FIG. 1. The controllable light source 110, responsive to receiving the RF signals 108, may turn the lighting load on or off and/or may adjust the intensity of the lighting load, for example via a load control circuit such as the load control circuit 212.

Figure 7A:
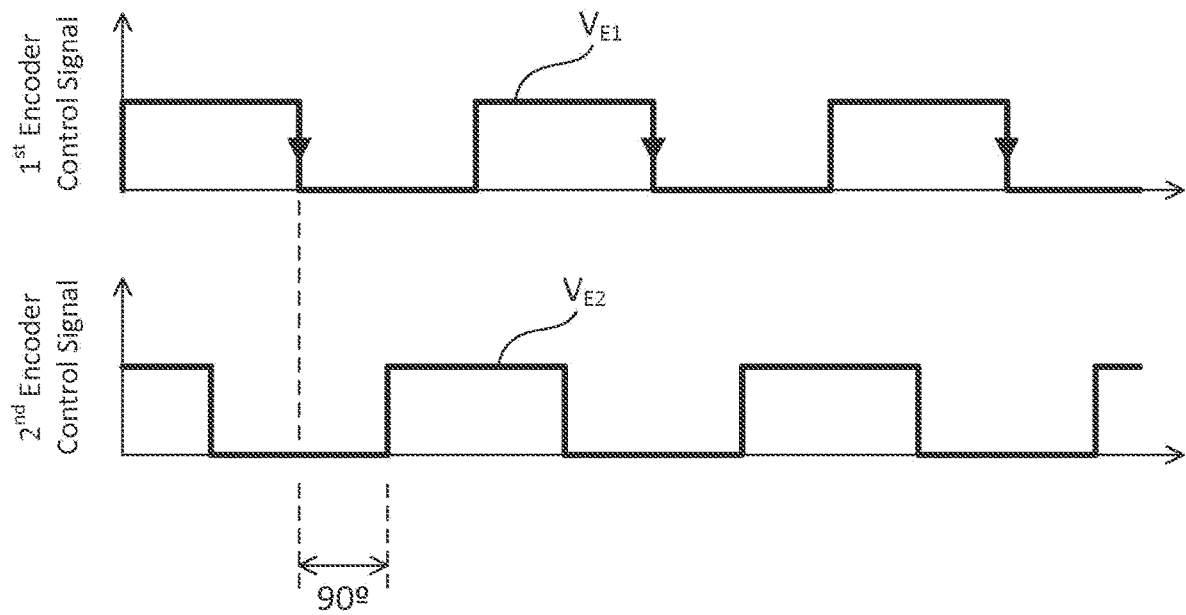
FIG. 7A depicts a first encoder control signal and a second encoder control signal when an example rotary remote control device is actuated along a first direction.
Figure 7B:
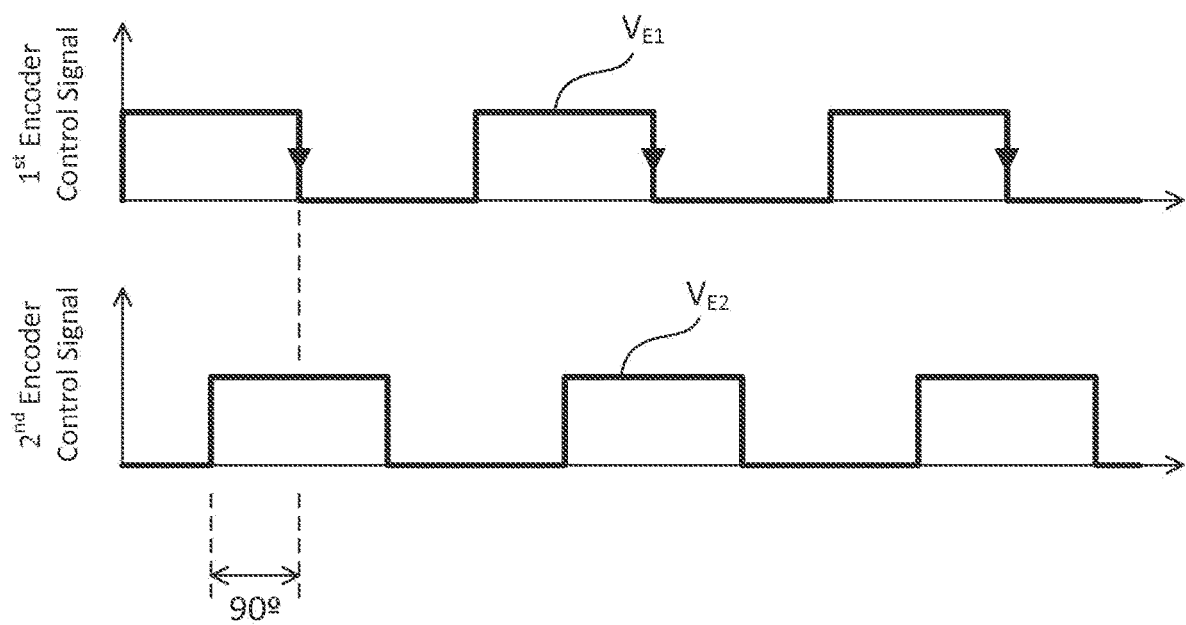
FIG. 7B depicts a first encoder control signal and a second encoder control signal when an example rotary remote control device is actuated along a second direction.

FIG. 7A is a simplified diagram showing example waveforms of the first encoder control signal $V_{E1}$ and the second encoder control signal $V_{E2}$ when the rotating portion 322 is being rotated in the clockwise direction. The first encoder control signal $V_{E1}$ lags the second encoder control signal $V_{E2}$ by 90° when the rotating portion 322 is rotated clockwise. FIG. 7B is a simplified diagram showing example waveforms of the first encoder control signal $V_{E1}$ and the second encoder control signal $V_{E2}$ when the rotating portion 322 is being rotated in the counter-clockwise direction. The second encoder control signal $V_{E2}$ lags the first encoder control signal $V_{E1}$ by 90° when the rotating portion 322 is rotated counter-clockwise.

The control circuit 530 may be configured to determine whether the second encoder control signal $V_{E2}$ is low (i.e., at approximately circuit common) or high (i.e., at approximately the battery voltage $V_{BATT}$) at the times of the falling edges of the first encoder control signal $V_{E1}$ (i.e., when the first encoder control signal $V_{E1}$ transitions from high to low), in order to determine whether the rotating portion 322 is being rotated clockwise or counter-clockwise, respectively.

Figure 8:
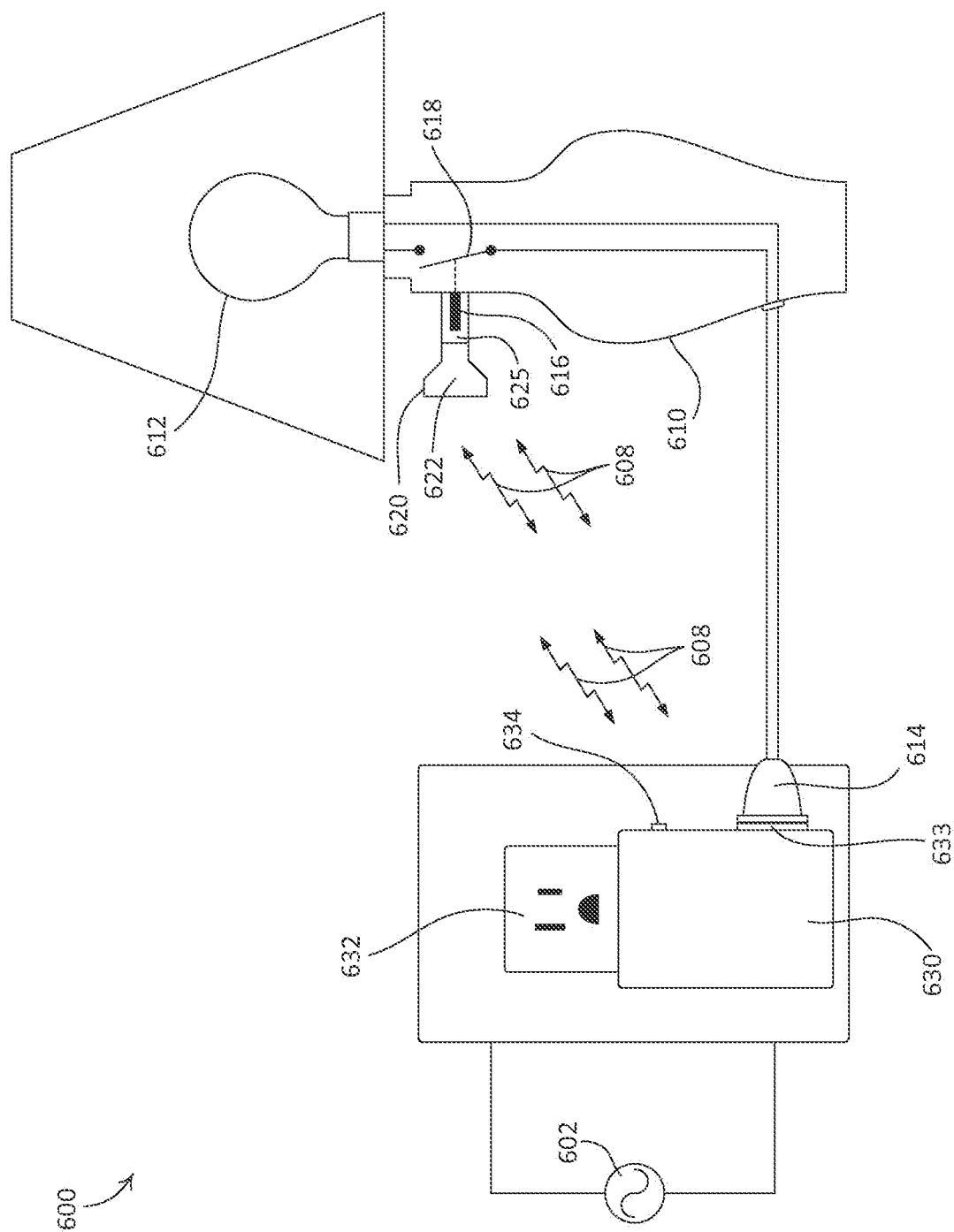
FIG. 8 depicts another example load control system.

FIG. 8 depicts another example load control system 600. As shown, the load control system 600 is configured as a lighting control system that includes a lamp 610 and a battery-powered rotary remote control device 620. The load control system 600 includes a plug-in load control device 630 (e.g., a "wall wart" plug-in device) configured to be plugged into a standard electrical receptacle 632 that is electrically connected to an AC power source 602. The plug-in load control device 630 may include one or more electrical outlets, such as an electrical outlet 633 located on a side of the plug-in load control device 630.

The lamp 610 includes a lighting load 612 (e.g., an incandescent lamp, a halogen lamp, a compact fluorescent lamp, an LED lamp, or other screw-in lamp) and an electrical plug 614 that is configured to be plugged into an electrical outlet. The plug 614 is plugged into the electrical outlet 633 of the plug-in load control device 630, such that the plug-in load control device 630 may control the amount of power delivered to, and thus the intensity of, the lighting load 612 of the lamp 610.

The lamp 610 may include a toggle actuator 616 operatively coupled to an internal mechanical switch 618 of the lamp 610 that is configured to turn the lighting load 612 on and off. The toggle actuator 616 may be a push-pull-type actuator that may be pushed and pulled to turn the lighting load 612 on and off, a push-push-type actuator that may be pushed to alternately turn the lighting load on and off, or a rotary-type actuator that may be rotated in opposed directions to turn the lighting load on and off. The lamp 610 is not limited to the illustrated table lamp configuration. Alternatively, the lamp 610 may be configured as a floor lamp, a wall mounted lamp, or any other lamp having a toggle actuator, such as the toggle actuator 616.

As shown, the rotary remote control device 620 is configured to mount over the toggle actuator 616 of the lamp 610 when the toggle actuator is in the on position and the switch 618 is closed (i.e., conductive). The rotary remote control device 620 may be configured to transmit wireless signals, for example RF signals 608, to the plug-in load control device 630 for controlling the amount of power delivered to the lamp 610, and thus the intensity of the lighting load 612. The plug-in load control device 630 includes an actuator 634 that may be actuated to associate the plug-in load control device 630 with the rotary remote control device 620 during a configuration procedure of the load control system 600, such that the plug-in load control device 630 may then be responsive to the RF signals 608 transmitted by the rotary remote control device 620.

As shown, the rotary remote control device 620 includes a rotating portion 622 and a base portion 625. One or more components of the rotary remote control device 620, for example the rotating portion 622 and the base portion 625, may be made of any suitable material, such as plastic. The rotating portion 622 may be supported by the base portion 625 so as to be rotatable in opposed directions about the base portion 625, for example in the clockwise or counter-clockwise directions. The base portion 625 may be configured to be fixedly attached relative to the toggle actuator 616 of the lamp 610 when the rotary remote control device 620 is mounted over the toggle actuator 616, such that rotation of the rotating portion 622 does not actuate the toggle actuator 616.

When the rotary remote control device 620 is mounted over the toggle actuator of a switch (e.g., the toggle actuator 616), the base portion 625 may function to secure the toggle actuator 616 from being toggled. For example, the base portion 625 may be configured to maintain the toggle actuator 616 in an on position, such that a user of the rotary remote control device 620 is not able to mistakenly switch the toggle actuator 616 to the off position, which may disconnect the lighting load 612 from the AC power source 602, such that the plug-in load control device 630 is not able to control the lighting load 612.

The rotary remote control device 620 includes electrical components (not shown) that may be housed inside the rotary remote control device 620. The electrical components of the rotary remote control device 620 may be configured similarly to those of the rotary remote control device 520 shown in FIG. 6. For example, components of the rotary remote control device 620 may include a control circuit, a rotary encoder circuit, a wireless communication circuit, a memory, and a battery. The rotary remote control device 620 may transmit one or more RF signals 608 to the plug-in load control device 630 for controlling the intensity of the lighting load 612 responsive to actuations of the rotating portion 622.

The plug-in load control device 630, responsive to receiving the RF signals 608, may turn the lighting load 612 on or off and/or may adjust the intensity of the lighting load 612, for example via a load control circuit. For example, the plug-in load control device 630 may turn the lighting load 612 on and off responsive to forces applied to (e.g., presses of) the rotating portion 622 of the rotary remote control device 620 that cause rotating portion 622 to be biased toward the base portion 625. The plug-in load control device 630 may adjust the intensity of the lighting load 612 responsive to one or more rotational forces applied to the rotating portion 622, for example in the clockwise and/or counter-clockwise directions. The plug-in load control device 630 may adjust the intensity of the lighting load 612 in accordance with the rotational speed at which the rotating portion 622 is rotated.

It should be appreciated that the load control system 600 need not include the plug-in load control device 630 for controlling the lighting load 612. For example, the load control system 600 may alternatively include a controllable light source that is associated with the rotary remote control device 620, for example the controllable light source 110 shown in FIG. 1, that is electrically connected to (e.g., screwed into the socket of) the lamp 610, such that actuations of the rotating portion 622 of the rotary remote control device 620 may adjust the intensity of the lighting load of the controllable light source and/or cause the lighting load of the controllable light source to turn on and/or off. It should further be appreciated that the load control system 100 shown in FIG. 1 may alternatively include a plug-in load control device (e.g., the plug-in load control device 630 shown in FIG. 8) that is configured to be controlled by the remote control device 120.

It should further still be appreciated that the load control systems 100 and/or 600 may include other types of load control devices and/or electrical loads that are configured to be controlled by one or more remote control devices (e.g., one or more remote control devices 120, 320, 520, and/or 620). For example, the load control systems 100 and/or 600 may include one or more of: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

It should further still be appreciated that while remote control devices configured to transmit wireless control signals to associated electrical load control devices, for example controllable light sources such as the controllable light source 110 or the plug-in load control device 630, are described herein with reference to the rotary remote control devices 320, 520, and 620, such remote control devices may be alternatively configured with other suitable control interfaces (e.g., intensity adjustment actuators), for example a slider or the like. Such a remote control device may include, for example, a base portion configured to mount over the toggle actuator of a switch, a slider operably coupled to the base portion, a wireless communication circuit, and a control circuit communicatively coupled to the slider and to the wireless communication circuit. The slider may be configured to move, for example linearly, with respect to the base portion. For example, the slider may be slidable, for example linearly, relative to the base portion. The base portion may thus be configured to slidably support the slider. The control circuit may be configured to translate a force applied to the intensity adjustment actuator, for example a force applied to the slider, into a signal for controlling the load control device. The control circuit may be configured to cause the wireless communication circuit to transmit the signal.

What is claimed is:

1. A remote control device configured to be mounted over an installed light switch, the light switch having a toggle actuator that extends through an opening of a faceplate of the installed light switch, the toggle actuator configured to control whether power is delivered to an electrical load, the remote control device comprising:

a control interface;
a base portion configured to support the control interface, the base portion configured to receive a portion of the toggle actuator and to engage with the opening of the faceplate when the remote control device is mounted over the installed light switch, the base portion configured to deter movement of the toggle actuator when the control interface is actuated;
a wireless communication circuit; and
a control circuit responsive to the control interface and communicatively coupled to the wireless communication circuit, the control circuit configured to, in response to actuation of the control interface, generate a control signal that causes an adjustment of an amount of power delivered to the electrical load, and transmit the control signal via the wireless communication circuit.

2. The remote control device of claim 1, wherein the control interface is operably coupled to the base portion and moveable relative to the base portion.

3. The remote control device of claim 2, wherein the control interface comprises an intensity adjustment actuator.

4. The remote control device of claim 3, wherein the intensity adjustment actuator comprises a rotatable portion that is rotatable around the base portion.

5. The remote control device of claim 4, wherein the control circuit is configured to translate a force applied to the rotatable portion into the control signal.

6. The remote control device of claim 5, wherein when the force is a rotational force, the control signal is indicative of changing the amount of power delivered to the electrical load.

7. The remote control device of claim 5, wherein the rotatable portion is further operably coupled to the base portion such that the rotatable portion is resiliently biasable toward the base portion.

8. The remote control device of claim 7, wherein when the force causes the rotatable portion to be biased toward the base portion, the control signal is indicative of power being applied to, or power being removed from, the electrical load.

9. The remote control device of claim 7, wherein when the force causes the rotatable portion to be biased toward the base portion, the control signal is indicative of associating the remote control device with a load control device that is configured to control the amount of power delivered to the electrical load.

10. The remote control device of claim 3, wherein the control circuit is configured to adjust the amount of power delivered to the electrical load in response to an actuation of the intensity adjustment actuator.

11. The remote control device of claim 1, wherein the base portion defines a snap fit catch configured to engage within the opening of the faceplate through which the toggle actuator extends.

12. The remote control device of claim 1, wherein the base portion is configured such that the toggle actuator is in an on position when the remote control device is mounted over the installed light switch.

13. The remote control device of claim 12, wherein the base portion is configured to, when the remote control device is mounted over the installed light switch, deter operation of the toggle actuator from the on position.

14. The remote control device of claim 1, wherein the wireless communication circuit comprises a radio frequency (RF) transmitter configured to transmit RF signals.

15. The remote control device of claim 1, wherein the control circuit is configured to cause the electrical load to turn on in response to an actuation of the control interface.

16. The remote control device of claim 1, wherein the control circuit is configured to cause the electrical load to turn off in response to an actuation of the control interface.

17. A remote control device configured to be mounted over an installed light switch, the installed light switch having a toggle actuator that extends through an opening of a faceplate of the installed light switch, the toggle actuator configured to control whether power is delivered to an electrical load, the remote control device comprising:
a control actuator; and
a base portion to which the control actuator is operably coupled such that the control actuator is moveable relative to the base portion, the base portion configured to receive a portion of the toggle actuator and to engage with the opening of the toggle actuator when the remote control device is mounted over the installed light switch, and the base portion defining a snap fit catch configured to engage within the opening of the faceplate through which the toggle actuator extends.

18. The remote control device of claim 17, further comprising:
a wireless communication circuit; and
a control circuit responsive to the control actuator and communicatively coupled to the wireless communication circuit, the control circuit configured to translate a force applied to the control actuator into a signal that causes an adjustment of an amount of power delivered to the electrical load, and to transmit the signal via the wireless communication circuit.

19. The remote control device of claim 18, wherein the control actuator comprises a rotatable portion that is rotatable around the base portion.

20. The remote control device of claim 19, wherein the control circuit is configured to translate a force applied to the rotatable portion into the signal.

21. The remote control device of claim 20, wherein the rotatable portion is further operably coupled to the base portion such that the rotatable portion is resiliently biasable toward the base portion.

22. The remote control device of claim 20, wherein when the force is a rotational force, the signal is indicative of a change in the amount of power delivered to the electrical load.

23. The remote control device of claim 18, wherein the control actuator comprises an intensity adjustment actuator, wherein the control circuit is configured to transmit the signal via the wireless communication circuit in response to an actuation of the intensity adjustment actuator, and wherein the signal causes the amount of power delivered to the electrical load to be adjusted between a low end intensity and a high end intensity.

24. The remote control device of claim 18, wherein the base portion is configured to deter movement of the toggle actuator when the force is applied to the control actuator.

25. The remote control device of claim 18, wherein the control circuit is configured to transmit the signal via the wireless communication circuit in response to an actuation of the control actuator, and wherein the signal causes the electrical load to turn on.

26. The remote control device of claim 18, wherein the control circuit is configured to transmit the signal via the wireless communication circuit in response to an actuation of the control actuator, and wherein the signal causes the electrical load to turn off.

27. The remote control device of claim 17, wherein the base portion is configured such that the toggle actuator is in an on position when received in the base portion.

28. The remote control device of claim 27, wherein the base portion is configured to, when the toggle actuator is received therein, deter operation of the toggle actuator from the on position.

29. A remote control device configured to be mounted over an installed light switch, the installed light switch having a toggle actuator that extends through an opening of a faceplate of the installed light switch, the toggle actuator configured to control whether power is delivered to an electrical load, the remote control device comprising:

a control interface comprising an intensity adjustment actuator with a rotatable portion;

a base portion configured to support the control interface, wherein the control interface is operably coupled to the base portion and moveable relative to the base portion such that the rotatable portion is rotatable around the base portion, the base portion configured to receive a portion of the toggle actuator and to engage with the opening of the faceplate when the remote control device is mounted over the installed light switch;

a wireless communication circuit; and a control circuit responsive to the control interface and communicatively coupled to the wireless communication circuit, the control circuit configured to, in response to actuation of the control interface, generate a control signal that causes an adjustment of an amount of power delivered to the electrical load, and transmit the control signal via the wireless communication circuit.

* * * * *